United States Patent
Bender

(10) Patent No.: US 11,347,995 B2
(45) Date of Patent: May 31, 2022

(54) NEURAL ARCHITECTURE SEARCH WITH WEIGHT SHARING

(71) Applicant: Google LLC, Mountain View, CA (US)

(72) Inventor: Gabriel Mintzer Bender, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/210,391

(22) Filed: Mar. 23, 2021

(65) Prior Publication Data

US 2021/0303967 A1 Sep. 30, 2021

Related U.S. Application Data

(60) Provisional application No. 62/993,573, filed on Mar. 23, 2020.

(51) Int. Cl.
*G06N 3/04* (2006.01)
*G06N 3/08* (2006.01)

(52) U.S. Cl.
CPC ............... *G06N 3/04* (2013.01); *G06N 3/08* (2013.01)

(58) Field of Classification Search
CPC .................................. G06N 3/04; G06N 3/08
USPC ........................................................... 706/25
See application file for complete search history.

(56) References Cited

U.S. PATENT DOCUMENTS 5,185,772 A * 2/1993 Shirouzu .............. G03G 5/14
 378/28
2019/0370648 A1 12/2019 Zoph et al.
2020/0302271 A1 * 9/2020 Ovtcharov ............ G06F 7/483
2021/0073612 A1 * 3/2021 Vahdat .................. G06N 3/082
2021/0081806 A1 * 3/2021 Chai ...................... G06N 3/08
2021/0150407 A1 * 5/2021 Xu .......................... G06N 3/08

OTHER PUBLICATIONS

Designing Neural Network Architectures Reinforcement Learning Using (Year: 2017).*
Understanding and Simplifying One-Shot Architecture Search (Year: 2018).*
A Disciplined Approach to Neural Network Hyper-Parameters: Part 1—Learning Rate, Batch Size, Momentum, and Weight Decay (Year: 2018).*
Bowen et.al._Designing Neural Network Architectures Reinforcement Learning Using. (Year: 2017).*
Gbriel et .al. _Understanding and Simplifying One-Shot Architecture Search. (Year: 2018).*
Leslie et. al._A Disciplined Approach to Neural Network Hyper-Parameters: Part 1—Learning Rate, Batch Size, Momentum, and Weight Decay (Year: 2018).*
Deep Reinforcement Learning for Reducing Latency in Mission Critical Services (Year: 2018).*
Baker et al, "Accelerating neural architecture search using performance prediction" arXiv, 2017, 14 pages.
Baker et al, "Designing neural network architectures using reinforcement learning" arXiv, 2017, 18 pages.

(Continued)

*Primary Examiner* — Eric Nilsson
*Assistant Examiner* — Em N Trieu
(74) *Attorney, Agent, or Firm* — Fish & Richardson P.C.

(57) ABSTRACT

Methods, systems, and apparatus, including computer programs encoded on computer storage media, for selecting a neural network to perform a particular machine learning task while satisfying a set of constraints.

23 Claims, 4 Drawing Sheets

(56) References Cited

OTHER PUBLICATIONS

Bender et al, "Understanding and simplifying one-shot architecture search" ICML, 2018, 10 pages.
Brock et al, "Smash" One-shot model architecture search through hyper-networks ICLR, 2018, 22 pages.
Cai et al, "ProxylessNAS: Direct Neural Architecture Search on Target Task and Hardware" arXiv, 2018, 13 pages.
Chen et al, "Detnas" Neural architecture search on object detection NIPS, 2019, 11 pages.
Cui et al, "Fast and practical neural architecture search" IEEE, 2019, 10 pages.
Dai et al, "Chamnet: Towards efficient network design through platform-aware model adaptation" IEEE, 2019, 10 pages.
Fedorov et al, "Sparse: Sparse architecture search for cnns on resource-constrained microcontrollers" arXiv, 2019, 26 pages.
Ghiasi et al, "Nas-fpn: learning scalable feature pyramid architecture for object detection" arXiv, 2019, 10 pages.
Goyal et al, "Accurate, large mini-batch sgd: Training imagenet in 1 hour" arXiv, 2017, 12 pages.
He et al, "Deep residual learning for image recognition" IEEE, 2016, 9 pages.
Howard et al, "Searching for MobileNetV3" ICCV, 2019, 11 pages.
Hsu et al., "Monas: Multi-objective neural architecture search using reinforcement learning" arXiv, 2018, 8 pages.
Hu et al "Squeeze-and-excitation networks" IEEE, 2018, 10 pages.
Huang et al,"Speed/accuracy trade-offs for modern convolutional object detectors" arXiv, 2017, 21 pages.
Kandasamy et al, "Neural architecture search with bayesian optimisation and optimal transport" NIPS, 2018, 10 pages.
Li et al, "Random search and reproducibility for neural architecture search" arXiv, 2019, 20 pages.
Lin et al,"Microsoft coco: Common objects in context" arXiv, 2019, 14 pages.
Lindauer et al, "Best practices for scientific research on neural architecture search" arXiv, 2019, 8 pages.
Liu et al,"Auto-deeplab: Hierarchical neural architecture serach for semantic image segmentation" IEEE, 2019, 11 pages.
Liu et al, "Darts: Differentiable architecture search" arXiv, 2019, 13 pages.
Liu et al, "Hierarchical representations for efficient architecture search" arXiv, 2017, 13 pages.
Liu et al, "Progressive neural architecture search" ECCV, 2018, 16 pages.
Loshchilov et al, "SGDR: Stochastic gradient descent with warm restarts" arXiv, 2016, 9 pages.
Luo et al, "Neural architecture optimization" NIPS, 2018, 12 pages.
Negrinho et al, "Deeparchitect: Automatically designing and training deep architectures" arXiv, 2017, 12 pages.
Pham et al, "Efficient neural architecture search via parameter sharing" arXiv, 2018, 11 pages.
Piergiovanni et al, "Tiny video networks" arXiv, 2019, 10 pages.
Ramachandran et al, "Searching for activation functions" arXiv, 2017, 13 pages.
Real et al, "Large-scale evolution of image classifiers" ICML, 2017, 18 pages.
Real et al, "Regularized evolution for image classifier architecture search" arXiv, 2019, 16 pages.
Sandler et al, "Mobilenetv2: Inverted residuals and linear bottlenecks" IEEE, 2018, 14 pages.
Simonyan et al, "Very deep convolutional networks fo large-scale image recognition" arXiv, 2014, 13 pages.
Stamoulis et al, "Single-path nas: Designing hardware-efficient convnets in less than 4 hours" arXiv, 2019, 16 pages.
Tan et al, "Efficientnet: Rethinking model scaling for convolutional neural networks" arXiv, 2019, 10 pages.
Tan et al, "Mnasnet: Platform-aware neural architecture search for mobile" IEEE, 2019, 9 pages.
Williams, "Simple statistical gradient-following algorithms for connectionist reinforcement learning" Machine Learning, 1992, 28 pages.
Wu et al, "FBNet: Hardware-aware efficient convnet design via differentiable neural architecture search" IEEE, 2019, 9 pages.
Xie et al, "Exploring randomly wired neural networks for image recognition" arXiv, 2019, 10 pages.
Xie et al, "SNAS: stochastic neural architecture search" arXiv, 2019, 17 pages.
Yang et al, "Netadapt: Platform-aware neural network adaptation for mobile applications" ECCV, 2018, 16 pages.
Yu et al, "Evaluating the search phase of neural architecture search" ICLR, 2019, 16 pages.
Zoph et al, "Learning transferable architectures for scalable image recognition" IEEE, 2018, 14 pages.
Zoph et al, "Neural architecture search with reinforcement learning" arXiv, 2016, 15 pages.
PCT International Search Report and Written Opinion in International Application No. PCT/US2021/023706, dated Jul. 9, 2021, 19 pages.

* cited by examiner

NEURAL ARCHITECTURE SEARCH WITH WEIGHT SHARING

CROSS-REFERENCE TO RELATED APPLICATION

This application claims priority to U.S. Provisional Application No. 62/993,573, filed on Mar. 23, 2020. The disclosure of the prior application is considered part of and is incorporated by reference in the disclosure of this application.

BACKGROUND

This specification relates to determining architectures for neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes how a system implemented as computer programs on one or more computers in one or more locations that determines a network architecture for a neural network that is configured to perform a particular machine learning task.

More specifically, the system determines an architecture for a neural network that performs the machine learning task within a specified set of resource constraints. That is, the resource constraints specify constraints on how many computational resources are consumed by the neural network when performing the task.

Particular embodiments of the subject matter described in this specification can be implemented so as to realize one or more of the following advantages.

Performing machine learning tasks on devices with limited computational resources, e.g., mobile devices, smart devices, or other edge devices, requires neural network architectures that are both accurate and computationally efficient. For example, the same specific neural network architecture can require more than an order of magnitude more inference time if it is deployed on a slower device. Furthermore, even two devices which have similar overall speeds (e.g., smartphone CPUs made by different manufacturers) can favor very different neural network architectures due to hardware and device driver differences. Consequently, particular embodiments described in this specification are motivated by considerations relating to how to determine neural network architectures of varying sizes that are optimized for specific devices having particular hardware resource constraints, and how to achieve effective deployment of such models on such devices.

More specifically, the described techniques can be used to search for neural network architectures for neural networks that can perform the task while satisfying resource constraints on resource consumption and to therefore identify a single architecture or a range of architectures that can be deployed effectively on a target set of one or more devices to compute inferences with a target latency or satisfy a different resource constraint.

In particular, the novel reward function described in this specification can allow the system to effectively identify an architecture that both performs well on the task and has approximately the target latency, i.e., a latency within an acceptable range of the target latency, (or other target resource requirement) when deployed on the target device(s).

Moreover, the described techniques allow the system to identify an architecture that has approximately a target latency (or satisfies some other resource constraint) while consuming many fewer computational resources than existing techniques for searching for such architectures. In particular, by making use of the described reward function, hyperparameter tuning requirements, which are typically quite computationally intensive, are drastically reduced when receiving a new latency target or when deploying on a different set of devices.

Additionally, the amount of memory consumed by the search process can be significantly reduced by making use of rematerialization, as described below.

Moreover, the quality of the resulting architecture can be improved by more effectively searching the search space through operations referred to below as filter warmup and op warmup.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
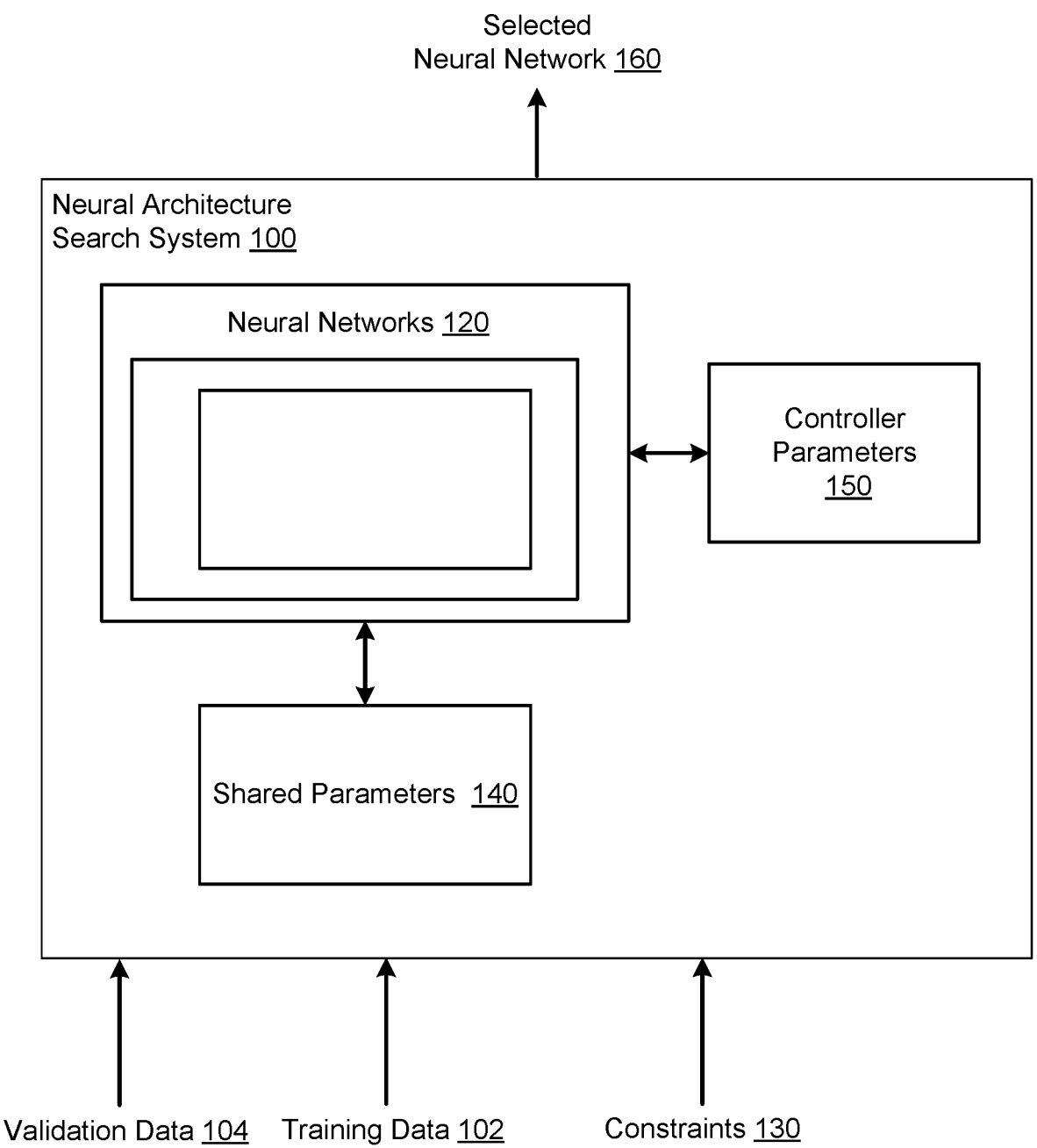
FIG. 1 shows an example neural architecture search system.

This specification describes a system implemented as computer programs on one or more computers in one or more locations that determines a network architecture for a neural network that is configured to perform a particular machine learning task.

Generally, the system determines an architecture by searching through a space of candidate architectures. Each candidate architecture in the space has a different subset of a shared set of model parameters. In other words, each candidate architecture performs a set of operations that use a different subset of the shared set of model parameters. The subset that each candidate architecture has is defined by a corresponding set of decision values that includes a respective decision value for each of a plurality of categorical decisions. In other words, the decision values for the categorical decisions specify which operations are performed by the candidate architecture and, accordingly, which model parameters from the shared set are used by the architecture.

The system determines the architecture by jointly updating (i) a set of controller policy parameters that define a respective probability distribution for each of the plurality of categorical decisions and (ii) the shared set of parameters. After the joint updating, the system can use the updated controller policy parameters to select one or more architectures.

Specifically, the description below describes that the system determines an architecture for a neural network that performs the machine learning task with approximately a specified target latency, e.g., a latency that falls within a specified range of the target latency, when deployed on a particular, target set of one or more computing devices.

More generally, however, the system can determine an architecture that satisfies any of a variety of resource constraints that specify how many computational resources can be consumed by the neural network when performing the task while deployed on the target set of computing devices.

As an example, in addition to or instead of the runtime latency of the neural network for performing an inference for an input or a batch of inputs, other examples of constraints include floating point operations per second (FLOPS) performed by the neural network while performing the task and the memory footprint of the neural network when deployed for performing the task.

In other words, if a different kind of computational resource consumption constraint is used, the latency term that is described below can be replaced with a similarly structured term that incorporates a different resource constraint in the reward function used to learn the controller policy parameters.

Moreover, the description below describes that the machine learning task is a computer vision task (also referred to as an "image processing task") and that the space of candidate architectures is a space of convolutional neural network architectures for performing the computer vision task.

In other words, in the description below, the neural network is a convolutional neural network that is configured to receive an input image and to process the input image to generate a network output for the input image, i.e., to perform some kind of image processing task. In this specification, processing an input image refers to processing the intensity values of the pixels of the image using a neural network.

For example, the task may be image classification and the output generated by the neural network for a given image may be scores for each of a set of object categories, with each score representing an estimated likelihood that the image contains an image of an object belonging to the category.

As another example, the task can be image embedding generation and the output generated by the neural network can be a numeric embedding of the input image.

As yet another example, the task can be object detection and the output generated by the neural network can identify locations in the input image, e.g., bounding boxes or other geometric regions within the image, at which particular types of objects are depicted.

As yet another example, the task can be image segmentation and the output generated by the neural network can define for each pixel of the input image which of multiple categories the pixel belongs to.

More generally, however, the described techniques can be used to determine an architecture for a neural network that can perform any of a variety of tasks, including tasks that process inputs other than images.

As an example, if the inputs to the neural network are Internet resources (e.g., web pages), documents, or portions of documents or features extracted from Internet resources, documents, or portions of documents, the task can be to classify the resource or document, i.e., the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, the task may be an audio processing task. For example, if the input to the neural network is a sequence representing a spoken utterance, the output generated by the neural network may be a score for each of a set of pieces of text, each score representing an estimated likelihood that the piece of text is the correct transcript for the utterance. As another example, the task may be a keyword spotting task where, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram or other data defining audio of the text being spoken in the natural language.

As another example, the task can be a health prediction task, where the input is electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

As another example, the task can be an agent control task, where the input is an observation characterizing the state of an environment and the output defines an action to be performed by the agent in response to the observation. The agent can be, e.g., a real-world or simulated robot, a control system for an industrial facility, or a control system that controls a different kind of agent.

As another example, the task can be a genomics task, where the input is a sequence representing a fragment of a DNA sequence or other molecule sequence and the output is either an embedding of the fragment for use in a downstream task, e.g., by making use of an unsupervised learning technique on a data set of DNA sequence fragments, or an output for the downstream task. Examples of downstream tasks include promoter site prediction, methylation analysis, predicting functional effects of non-coding variants, and so on.

In some cases, the machine learning task is a combination of multiple individual machine learning tasks, i.e., the neural network is configured to perform multiple different individual machine learning tasks, e.g., two or more of the machine learning tasks mentioned above. For example, the neural network can be configured to perform multiple individual natural language understanding tasks. Optionally, the network input can include an identifier for the individual natural language understanding task to be performed on the network input. As another example, the neural network can be configured to perform multiple individual image processing or computer vision tasks, i.e., by generating the output for the multiple different individual image processing tasks in parallel by processing a single input image.

FIG. 1 shows an example neural architecture search system 100. The neural architecture search system 100 is an example of a system implemented as computer programs on one or more computers in one or more locations, in which the systems, components, and techniques described below can be implemented.

The neural architecture search system 100 is a system that obtains training data 102 and validation data 104 for a particular machine learning task and selects a neural network 150 for performing the task using the training data 102 and the validation data 104.

Generally, both the training data 102 and the validation data 104 include a set of neural network inputs (also referred to as training or validation examples) and, for each network input, a respective target output that should be generated by the neural network to perform the particular task. The training data 102 and the validation data 104 can include different sets of neural network inputs, i.e., so that the validation data 104 can be used to effectively measure how well a neural network that has been trained on the training data 102 performs on new inputs.

The system 100 can receive the training data 102 and the validation data 104 in any of a variety of ways. For example, the system 100 can receive training data as an upload from a remote user of the system over a data communication network, e.g., using an application programming interface (API) made available by the system 100. The system 100 can then randomly divide the received training data into the training data 102 and the validation data 104. As another example, the system 100 can receive an input from a user specifying which data that is already maintained by the system 100 should be used for training the neural network.

The system 100 also receives, e.g., from a user, constraint data 130 that specifies a target latency for performing the machine learning task after training and during inference, i.e., for processing new inputs for the particular task after the architecture has been determined.

Generally, the target latency is a target latency for the neural network when deployed on a target set of one or more computing devices.

As one example, the target set of one or more hardware devices can be a single, specific edge device, e.g., a mobile phone, a smart speaker or another embedded computing device, or other edge device. As a particular example, the edge device can be a mobile phone or other device with a specific type of hardware accelerator or other computer chip on which the neural network will be deployed.

As another example, the target set of one or more hardware devices can be a set of one or more hardware accelerator devices, e.g., ASICs, FPGAs, or tensor processing units (TPUs) on a real-world agent, e.g., a vehicle, e.g., a self-driving car, or a robot.

As yet another example, the target set of one or more hardware accelerator devices can be a set of hardware accelerators in a data center.

That is, the target latency measures the time, e.g., in milliseconds, required to perform inference for a batch of one or more examples, i.e., to process each example in the batch using the neural network, when the neural network is deployed on the target set of one or more computing devices. As a particular example, the latency can measure the time required to process the batch on a particular smart device having a specific hardware configuration, e.g., a specific processor, a specific memory architecture, and so on.

Thus, using the techniques described below, the system 100 can effectively select a neural network to be deployed on a specified target set of one or more devices while having an acceptable latency, e.g., a latency that is approximately equal to the target latency specified in the constraint data 130.

The system 100 then uses the training set 102, the validation data 104, and the constraint data 130 to determine an architecture by searching through a space 120 of candidate architectures.

Each candidate architecture in the space 120 has a different subset of a shared set of model parameters 140. In other words, each candidate architecture performs a set of operations that use a different subset of the shared set of model parameters.

The subset of the shared model parameters 140 that each candidate architecture has is defined by a corresponding set of decision values that includes a respective decision value for each of a plurality of categorical decisions.

In other words, the decision values for the categorical decisions specify which operations are performed by the candidate architecture and, accordingly, which model parameters from the shared set 140 are used by the architecture.

Generally, an architecture for a neural network defines the number of layers in the neural network, the operations performed by each of the layers, and the connectivity between the layers in the neural network, i.e., which layers receive inputs from which other layers in the neural network.

Thus, the possible values for the categorical decisions define one or more of the aspects of the architecture of the neural network, with any aspects that are not defined by the categorical decisions being fixed, i.e., the same for all of the architectures in the space of candidate architectures.

Generally, the categorical decisions include multiple different types of categorical decisions that each correspond to a respective point in a neural network.

As one example, the categorical decisions can include binary decisions that determine whether a corresponding layer (or other operation) in the neural network is skipped or is included in the neural network architecture.

As another example, the categorical decisions can include decisions that specify which operation(s) from a corresponding set of operations are performed at a given point in the neural network. For example, a categorical decision can specify whether a given layer in the architecture is a convolutional layer, an inverted bottleneck layer, and so on. As another example, a categorical decision can specify which of a set of different convolutions are performed, e.g., by specifying spatial size of the filters of a convolutional layer in the convolutional neural network.

As yet another example, the categorical decisions can include decisions that specify the number of output filters of a convolutional neural network layer in the convolutional neural network. Thus, the decision values for this type of categorical decision correspond to different numbers of output filters ranging from a minimum number to a maximum number.

To maximize parameter sharing, the system can specify that, for each particular decision of this type of categorical decision (i.e., each decision that defines the number of output filters of a convolutional layer), the candidate architecture defined by a set of decision values having any given decision value for the particular categorical decision still includes the convolutional neural network layer with the maximum number of output filters, i.e., instead of with just the number corresponding to the given decision value, but with certain output filters masked out.

In particular, the system can mask out, i.e., zero out, a number of output filters that is equal to a difference between (i) the maximum number and (ii) the number corresponding to the given decision value zeroed out. Thus, the decision value for the categorical decision determines which output filters of a set that includes the maximum number of output filters are zeroed out. By implementing this sharing in this manner, at least some of the output filters are shared across all of the decision values for the particular decision.

Some examples of search spaces and the corresponding sets of categorical decisions that define these search spaces are described below in Table 1.

searchable through corresponding decisions while the number of output filters are fixed to base size c for each layer i. Optionally the search space can also include decisions that determine whether to skip certain ones of the layers.

The ProxylessNAS search space is described in more detail in Han Cai, Ligeng Zhu, and Song Han. *Proxylessnas: Direct neural architecture search on target task and hardware*. arXiv preprint arXiv:1812.00332, 2018, the entire contents of which are hereby incorporated by reference in their entirety.

The ProxylessNAS-Enlarged search space expands the ProxylessNAS search space by adding a respective decision for each inverted bottleneck layer that selects the number of output filters for the bottleneck layer relative to the base size $c_i$ for each layer i.

The MobileNetV3-like search space expands the ProxylessNAS-Enlarged search space in several ways. Different from the previous spaces, models in this space utilize the SiLU/Swish activation function and a compact head. These are described in Andrew Howard, Mark Sandler, Grace Chu, Liang-Chieh Chen, Bo Chen, Mingxing Tan, Weijun Wang, Yukun Zhu, Ruoming Pang, Vijay Vasudevan, et al. *Searching for mobilenetv3*. In International Conference on Computer Vision, 2019, the entire contents of which are hereby incorporated herein in their entirety.

The search space is also larger than the previous two. First, inverted bottleneck expansion ratios can be selected from a larger set than the other search spaces. Second, a respective decision is added to each inverted bottleneck to determine whether a Squeeze-and-Excite module is added to the inverted bottleneck.

While Table 1 shows three example search spaces, it should be understood that the described techniques can be used to search any search space that is defined by possible

TABLE 1

| Search Space | Built Around | Base Filters Sizes ($c_i$'s for each layer) | Typical Choices within an Inverted Bottleneck Layer | | | |
| --- | --- | --- | --- | --- | --- | --- |
| | | | Expansion Ratio | Kernel | Output filter size | SE |
| ProxylessNAS | MobileNetV2 | ProxylessNAS[5] | {3,6} | {3,5,7} | $c_i$ | ✗ |
| ProxylessNAS-Enlarged | MobileNetV2 | x2 when stride = 2 | {3,6} | {3,5,7} | $C_i x \left\{ \frac{1}{2}, \frac{5}{8}, \frac{3}{4}, 1, \frac{5}{4}, \frac{3}{2}, 2 \right\}$ | ✗ |
| MobileNetV3-Like | MobileNetV3 | x2 when stride = 2 | {1,2,3,4,5,6} | {3,5,7} | $C_i x \left\{ \frac{1}{2}, \frac{5}{8}, \frac{3}{4}, 1, \frac{5}{4}, \frac{3}{2}, 2 \right\}$ | {✗,✓} |

In particular, Table 1 describes three example search spaces: ProxylessNAS, ProxylessNAS-Enlarged, and MobileNetV3-like.

The ProxylessNAS search space is built to explore variations of a base architecture, MobilenetV2, that includes a stack of inverted bottleneck layers.

Generally, each inverted bottleneck layer receives a tensor with k channels, applies a 1×1 convolution to the tensor to expand the number of channels by an expansion ratio, applies a depthwise convolution having a given depthwise kernel size to the expanded tensor, and then applies a 1×1 convolution to the output of the depthwise convolution to reduce the number of channels. The output can optionally be combined with the input tensor using a residual connection. In some cases, some of the convolutions can be separated by other operations, e.g., one or more of activation functions, normalization functions, or squeeze-and-excite modules. In the ProxylessNAS search space, the expansion ratio and the depthwise kernel size for each inverted bottleneck layer are values of a set of categorical decisions. For example, different search spaces can have layers that are made up of different kinds of operations, e.g., different kinds of residual blocks or different kinds of convolutional operations, e.g., separable convolutions, dilated convolutions, spatial convolutions, and so on.

Additionally, as indicated above, the values for the categorical decisions can define a portion of the final architecture, with the remaining portion being fixed. For example, the remaining portion can include a fixed initial set of one or more layers or a fixed set of output layers or both.

The system 100 determines the architecture by jointly updating (i) a set of controller policy parameters 150 that define a respective probability distribution for each of the plurality of categorical decisions and (ii) the shared set of parameters 140.

In some implementations, prior to beginning the joint updating, the system first pre-trains the shared set of parameters 140 without making use of the controller policy parameters 150. This "warm up" phase of the search will be described below with reference to FIG. 4.

After the joint updating, the system 100 selects, as the architecture for the neural network, a candidate architecture that is defined by respective particular decision values for each of the plurality of categorical decisions using the updated controller policy parameters 150.

The system 100 can then provide data 160 specifying the selected neural network, i.e., data specifying the architecture of the selected neural network, for deployment for performing the neural network task, i.e., performing inference, on the target set of one or more hardware devices, e.g., through an API provided by the system 100. Alternatively or in addition, the system 100 can deploy the selected neural network on the target set of one or more hardware devices and use the selected neural network to process new network inputs received by the target set of one or more devices.

When deploying the selected neural network, the system 100 can either use the values of the corresponding subset of the shared set of parameters 140, i.e., can deploy the neural network without any additional training, or can first further train the selected neural network, e.g., on additional training data or for a longer time.

Figure 2:
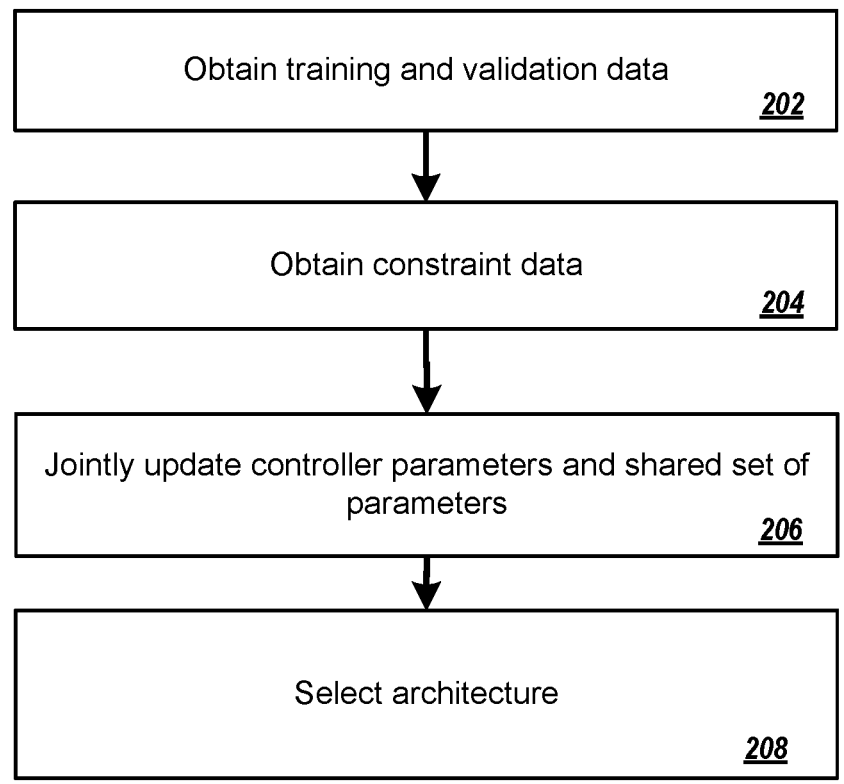
FIG. 2 is a flow diagram of an example process for selecting a neural network to be deployed for performing a machine learning task.

FIG. 2 is a flow diagram of an example process 200 for selecting a neural network to be deployed for performing a machine learning task. For convenience, the process 200 will be described as being performed by a system of one or more computers located in one or more locations. For example, a neural architecture search system, e.g., the neural architecture search system 100 of FIG. 1, appropriately programmed, can perform the process 200.

The system receives training data and validation data for a particular machine learning task (step 202).

The system receives constraint data specifying a target latency for performing the particular machine learning task (step 204). For example, the target latency can be a measure of the time required to process a single input or a batch of multiple inputs through the trained neural network when deployed on a target set of computing devices.

The system selects, from a space of candidate architectures and using the training data and the validation data, an architecture for a neural network to be deployed for performing the machine learning task.

As described above, each candidate architecture in the space has a different subset of a shared set of model parameters that is defined by a corresponding set of decision values that includes a respective decision value for each of a plurality of categorical decisions.

More specifically, to select the architecture, the system jointly updates (i) a set of controller policy parameters that define, for each of the plurality of categorical decisions, a respective probability distribution over decision values for the categorical decision and (ii) the shared set of parameters (step 206).

Generally, the system updates the set of controller policy parameters through reinforcement learning to maximize a reward function that measures an estimated quality and an estimated latency of candidate architectures defined by sets of decision values sampled from probability distributions generated using the controller policy parameters.

The reward function includes (i) a quality term that measures the estimated quality of a candidate architecture and (ii) a latency term that is based on an absolute value of a term that compares the estimated latency of the candidate architecture and the target latency. For example, the latency term can be a product of the absolute value and a fixed, negative scalar value that governs the relative contribution of the latency term to the reward, i.e., relative to the quality.

By making use of the described reward function, the system can avoid the need for a computationally expensive hyperparameter search to determine an optimal value for the scalar value and can re-use the same scalar value to search for architectures for multiple different tasks, multiple different target latencies, or both. In particular, other, existing architecture search techniques that target a specified latency may also include a quality term and a latency term. However, when receiving a new specified target latency, an extremely computationally intensive hyperparameter search is required to determine the value of the scalar value that governs the relative contribution of the latency term to the reward that results in the best performing architecture that also satisfies the newly specified target latency. By making use of the described reward function, however, the system can re-use the same scalar value for a large range of possible target latencies.

As a particular example, the reward function can be a sum of the quality term and the latency term.

As another particular example, the term that compares the estimated latency of the candidate architecture and the target latency can be equal to a difference between (i) a ratio between the estimated latency of the candidate architecture and the target latency and (ii) one.

In particular, the reward function $r(\alpha)$ for a given candidate architecture a can satisfy:

$$r(\alpha) = Q(\alpha) + \beta \left| \frac{T(\alpha)}{T_0} - 1 \right|,$$

where $Q(\alpha)$ is the quality term, $\beta$ is the negative scalar, $T(\alpha)$ is the estimated latency, and $T_0$ is the target latency.

Additionally, the system updates the shared set of model parameters to optimize an objective function that measures a performance on the particular machine learning task of the candidate architectures defined by the sets of decision values sampled from the probability distributions generated using the controller policy parameters.

This joint updating is described in more detail below with reference to FIG. 3.

Optionally, prior to the joint updating, the system can perform a "warm up" phase where the system updates the shared set of parameters without using (or updating) the controller policy parameters.

Performing the warm up phase is described in more detail below with reference to FIG. 4.

After the joint updating, the system selects, as the architecture for the neural network, a candidate architecture that is defined by respective particular decision values for each of the plurality of categorical decisions (step 208).

For example, the system can select the candidate architecture by, for each of the categorical decisions, selecting as the particular decision value the decision value having the highest probability in the probability distribution for the categorical decision (or, equivalently, the decision value having the highest corresponding parameter value).

Figure 3:
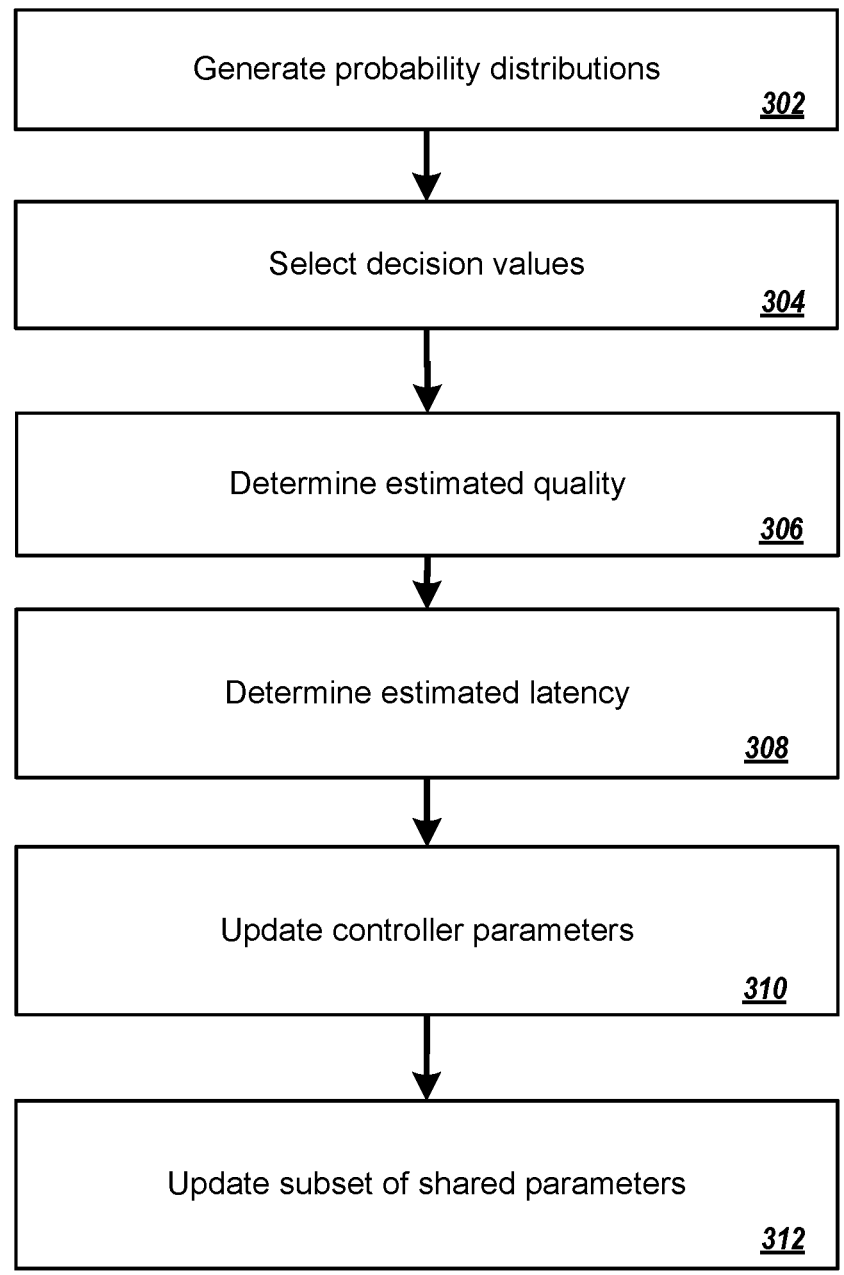
FIG. 3 is a flow diagram of an example process for performing an iteration of the joint updating.

FIG. 3 is a flow diagram of an example process 300 for performing an iteration of the joint updating. For convenience, the process 300 will be described as being performed by a system of one or more computers located in one or more locations. For example, a neural architecture search system, e.g., the neural architecture search system 100 of FIG. 1, appropriately programmed, can perform the process 300.

The system can repeatedly perform iterations of the process 300 to repeatedly update the controller policy parameters and the shared set of model parameters.

The system generates a respective probability distribution for each of the plurality of categorical decisions in accordance with current values of the controller policy parameters (step 302).

In particular, the controller policy parameters can include, for each categorical decision, a respective parameter for each possible decision value for the decision. The system can generate a probability distribution for a given categorical decision by applying a softmax to the current values of the respective parameters for each of the possible decision values for the given decision.

The system selects a respective decision value for each of the plurality of categorical decisions using the respective probability distributions (step 304). For example, the system can, for each categorical decision, sample a decision value from the probability distribution for the categorical decision.

The system determines, using the validation data, an estimated quality on the particular machine learning task of a neural network having a candidate architecture that has a subset of the shared set of model parameters that is defined by the selected decision values for the categorical decisions (step 306).

In particular, the system determines the estimated quality in accordance with current values of the subset of the shared set of model parameters that is defined by the selected decision values for the categorical decisions.

As a particular example, the system can determine the estimated quality to be a quality of the neural network having the candidate architecture on a batch of multiple validation examples from the validation data. That is, the system can process each validation input in the batch using a neural network having the candidate architecture and in accordance with current values of the corresponding subset of the shared set of model parameters to generate a predicted output and then compute, using the target outputs for the validation inputs, an accuracy or other appropriate performance measure for the machine learning task for the predicted outputs.

The system determines, using the validation data, an estimated latency when performing the particular machine learning task of the neural network having the candidate architecture that has the subset of the shared set of model parameters that is defined by the selected decision values for the categorical decisions (step 308).

That is, the estimated latency is an estimate of the latency, i.e., the time, e.g., in milliseconds, required to perform inference for a batch of one or more examples, when the neural network is deployed on the target set of one or more computing devices. As a particular example, the estimated latency can be an estimate of the time required to process the batch on a particular smart device having a specific hardware configuration, e.g., a specific processor, a specific memory architecture, and so on.

In some implementations, the system determines latencies for each example in a batch of validation examples when the neural network having the candidate architecture is deployed on the particular set of one or more computing devices. That is, the system can process each validation input in the batch using a neural network having the candidate architecture that is deployed on the target set of devices to generate a predicted output and then measure the latency of processing the batch.

In some other implementations, the system can make use of a hardware simulator that simulates the target hardware device to simulate the effect of deploying the neural network on the target device to determine the estimated latency.

In yet other implementations, the system can maintain data that specifies, for each possible operation that can be performed by any of the candidate architectures, the time required to perform the operation on the target set of devices. The system can then determine the latency by determining the time required to perform all of the operations in the candidate architecture on the target set of devices using the maintained data.

The system determines, through reinforcement learning, an update to the controller policy parameters that improves the reward function based on the estimated quality and the estimated latency (step 310). In particular, the system can perform an update step of a policy gradient reinforcement learning algorithm, e.g., the REINFORCE algorithm, on the computed reward, i.e., on the output of the reward function, for the estimated quality and the estimated latency to determine the update to the controller policy parameters.

In some cases, the system can exponentially increase the learning rate of the reinforcement learning updates to the controller policy parameters during the joint updating. In particular, by using the described absolute value-based reward function, it may be the case that while the average inference time of models sampled using the controller parameters is consistently close to the target as training progresses, the inference time of the most likely architecture selected at the end of the search could be several milliseconds lower (and that, therefore, a higher performing but slower architecture could still satisfy the latency constraint). The system can alleviate this by adjusting the learning rate schedule of the reinforcement learning updates. Instead of using a constant learning rate through the search, the system can exponentially increase the reinforcement learning rate over time. This allows the controller to explore the search space (with a relatively low learning rate) at the start of the search, but also ensures that the entropy of the RL controller is low at the end of the search, preventing the mismatch between average and most likely inference times.

The system determines, using the training data, an update to the current values of the subset of the shared set of model parameters that is defined by the selected decisions for the categorical decisions shared set of parameters by optimizing an appropriate objective function for the particular machine learning task (step 312).

For example, the system can sample a batch of training examples from the training data and perform a training step on the sampled batch using an appropriate deep learning algorithm, e.g., stochastic gradient descent, to compute a gradient update, i.e., to compute a gradient of the objective function with respect to the subset of model parameters, and then apply the gradient update, i.e., add or subtract, to the current values of the subset.

As will be described in more detail below, in some cases the system performs rematerialization during step 312 in order to reduce the memory requirements of the training. In rematerialization, when updating the shared set of parameters, the system stores only a proper subset of intermediate outputs generated by any given neural network having any given candidate architecture during the forward pass through the given neural network and recomputes intermediate outputs that are not in the proper subset during the backward pass through the neural network to compute the gradient of the objective function.

By repeatedly performing the process 300, the system updates the controller parameters so that decision values that result in candidate architectures that are highly performing while satisfying the latency constraints are assigned higher probabilities relative to decision values that result in either low performing architectures of architectures that do not satisfy the latency constraints.

Figure 4:
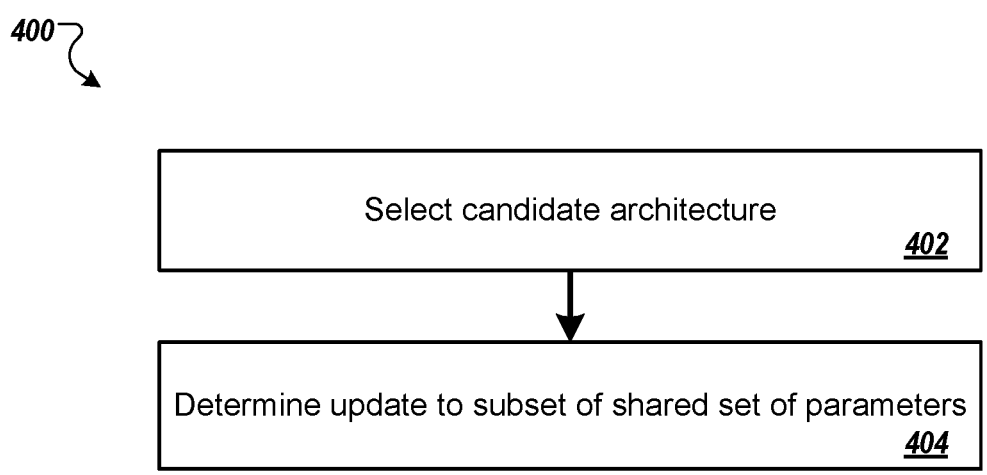
FIG. 4 is a flow diagram of an example process for performing a warm up phase of the architecture search.

FIG. 4 is a flow diagram of an example process 400 for performing a warm up phase of the architecture search. For convenience, the process 400 will be described as being performed by a system of one or more computers located in one or more locations. For example, a neural architecture search system, e.g., the neural architecture search system 100 of FIG. 1, appropriately programmed, can perform the process 400.

The system can repeatedly perform the process 400, e.g., until a threshold number of iterations have been performed or until a certain amount of time has elapsed. Once the last iteration of the process 400 has been performed, the system can begin performing the process 300, i.e., begin performing the joint updating.

The system selects a candidate architecture from the space of candidate architectures (step 402).

In particular, the system selects the candidate architecture without using the controller parameters. For example, the system can select the candidate architecture by, for each categorical decision, sampling a decision value from a fixed initial probability distribution, e.g., a uniform distribution, over the possible decision values.

In some implementations, however, the system implements op warmup, filter warmup, or both, when selecting the candidate architecture.

As described above, some types of categorical decisions select an operation form a set of operations to be performed at a corresponding point in the neural network. In some implementations, the system implements op warmup to ensure that search space of possible operations is sufficiently explored during the warmup phase. In op warmup, for a given categorical decision of this type, the system (i) with probability p, includes the operations represented by all of the respective decision values for the categorical decision in the candidate architecture, and (ii) with probability 1−p, samples a decision value from the fixed initial probability distribution for the categorical decision and includes only the operation(s) represented by the sampled decision value in the candidate architecture. Thus, with probability p, the system activates all of the possible operations for the categorical decision instead of sampling a single operation using the fixed initial distribution.

For example, the system can apply op warmup for all categorical decisions that correspond to selecting one of multiple operations. As another example, at each iteration of the process 400 the system can select, e.g., a randomly, a fixed size subset of these categorical decisions for which to apply op warmup.

When op warmup is used, the system can linearly decrease p from 1 to 0 during the updating of the shared set of parameters without updating the controller policy parameters, i.e., while performing the warmup phase.

Filter warmup can be used for categorical decisions that represent a number of output filters of a convolutional neural network layer in the convolutional neural network and can account for some filters always being trained while others are rarely trained due to the parameter sharing scheme.

In particular, when using filter warmup and for a particular categorical decision, the system (i) with probability q, configures the convolutional neural network layer to have the maximum number of output filters with none of the output filters zeroed out, and (ii) with probability 1−q, samples a decision value from the fixed initial probability distribution for the particular categorical decision and configures the convolutional neural network layer to have the maximum number of output filters but with a number of output filters equal to a difference between the maximum number and the number corresponding to the sampled decision value zeroed out.

When using filter warmup, the system linearly decreases q from 1 to 0 during the updating the shared set of parameters without updating the controller policy parameters, i.e., while performing the warmup phase.

The system then determines, using the training data, an update to the subset of the shared set of model parameters that are in the selected candidate architecture by optimizing the objective function for the particular machine learning task (step 404). The system can perform this update as described above with reference to FIG. 3.

When op warmup is used and the system determines to include operations represented by all of the respective decision values for a given categorical decision in the candidate architecture, the system performs all of the operations represented by all of the respective decision values on the input to the corresponding point in the neural network and then averages the outputs of those operations to determine the single output of the corresponding point in the neural network.

When op warmup is used, determining this model parameter update can use a significant amount of memory. In particular, the intermediate outputs of all of the operations represented by all of the respective decision values need to be stored in order for gradients to be computed during the backward pass through the neural network. To alleviate this, in some implementations, the system uses rematerialization.

When rematerialization is used, during a forward pass through the neural network for a batch of training examples, the system applies each of the operations to each input to a point in the neural network represented by the categorical decision and computes, for each input, an average of the outputs of the operations for the input as an output of the point in the neural network represented by the categorical decision. The system then stores only the inputs to the categorical decision and the outputs of the categorical decision for use in a backward pass through the neural network (and not the outputs of the individual operations). During the backward pass through the neural network for the batch of training examples, i.e., when computing gradients, the system recomputes the outputs of the operations by again applying each of the operations to the stored inputs to the categorical decision. Thus, the system can effectively apply op warmup without a corresponding increase to the memory requirements of the training process.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, specialpurpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   receiving training data and validation data for a particular machine learning task;
   receiving data specifying a target latency for performing the particular machine learning task; and
   selecting, from a space of candidate architectures and using the training data and the validation data, an architecture for a neural network to be deployed for performing the machine learning task,
   wherein each candidate architecture in the space has a different subset of a shared set of model parameters that is defined by a corresponding set of decision values that includes a respective decision value for each of a plurality of categorical decisions, and
   wherein the selecting comprises:
      jointly updating (i) a set of controller policy parameters that define, for each of the plurality of categorical decisions, a respective probability distribution over decision values for the categorical decision and (ii) the shared set of parameters, wherein:
         updating the set of controller policy parameters comprises updating the set of controller policy parameters through reinforcement learning to maximize a reward function that measures an estimated quality and an estimated latency of candidate architectures defined by sets of decision values sampled from probability distributions generated using the controller policy parameters,
         the reward function includes a quality term that measures the estimated quality of a candidate architecture and a latency term that is based on an absolute value of a term that compares the estimated latency of the candidate architecture and the target latency, and
         updating the shared set of model parameters comprises updating the shared set of model parameters to optimize an objective function that measures a performance on the particular machine learning task of the candidate architectures defined by the sets of decision values sampled from the probability distributions generated using the controller policy parameters; and
      after the joint updating, selecting as the architecture for the neural network, a candidate architecture that is defined by respective particular decision values for each of the plurality of categorical decisions.

2. The method of claim 1, wherein the joint updating comprises repeatedly performing operations comprising:
   generating a respective probability distribution for each of the plurality of categorical decisions in accordance with current values of the controller policy parameters,
   selecting a respective decision value for each of the plurality of categorical decisions using the respective probability distributions,
   determining, using the validation data, an estimated quality on the particular machine learning task of a neural network having a candidate architecture that has a subset of the shared set of model parameters that is defined by the selected decision values for the categorical decisions, wherein the quality is estimated in accordance with current values of the subset of the shared set of model parameters that is defined by the selected decision values for the categorical decisions,
   determining, using the validation data, an estimated latency when performing the particular machine learning task of the neural network having the candidate architecture that has the subset of the shared set of model parameters that is defined by the selected decision values for the categorical decisions, determining, through reinforcement learning, an update to the controller policy parameters that improves the reward function based on the estimated quality and the estimated latency, and determining, using the training data, an update to the current values of the subset of the shared set of model parameters that is defined by the selected decisions for the categorical decisions shared set of parameters by optimizing an objective function for the particular machine learning task.

3. The method of claim 2, wherein determining the update to the current values of the subset of the shared set of model parameters comprises computing a gradient update to the current values on a batch of training examples from the training data.

4. The method of claim 2, wherein determining, using the validation data, an estimated latency comprises determining latencies of the neural network having the candidate architecture for each validation example in a batch of validation examples from the validation data.

5. The method of claim 4, wherein the target latency is a target latency for the neural network when deployed on a particular set of one or more computing devices, and wherein determining latencies comprises determining latencies for each validation example in the batch of validation examples when the neural network having the candidate architecture is deployed on the particular set of one or more computing devices.

6. The method of claim 2, wherein determining, using the validation data, an estimated quality on the particular machine learning task of the neural network having the candidate architecture comprises determining a quality of the neural network having the candidate architecture on a batch of validation examples from the validation data.

7. The method of claim 1, wherein the reward function is a sum of the quality term and the latency term.

8. The method of claim 1, wherein the term in the reward function that compares the estimated latency of the candidate architecture and the target latency is a difference between (i) a ratio between the estimated latency of the candidate architecture and the target latency and (ii) one.

9. The method of claim 1, wherein the latency term is a product of the absolute value and a negative scalar value.

10. The method of claim 1, wherein after the joint updating, selecting as the architecture for the neural network, a candidate architecture that is defined by respective particular decision values for each of the plurality of categorical decisions comprises:

for each of the categorical decisions, selecting as the particular decision value the decision value having a highest probability in the probability distribution for the categorical decision.

11. The method of claim 1, wherein the selecting further comprises:

prior to the joint updating, updating the shared set of parameters without updating the controller policy parameters by repeatedly performing operations comprising:

selecting a candidate architecture from the space; and determining, using the training data, an update to the subset of the shared set of model parameters that are in the selected candidate architecture by optimizing the objective function for the particular machine learning task.

12. The method of claim 11, wherein selecting the candidate architecture comprises, for each of one or more of the categorical decisions:

with probability p, including operations represented by all of the respective decision values for the categorical decision in the candidate architecture, and with probability 1−p, sampling a decision value from a fixed initial probability distribution for the categorical decision and including only the sampled decision value in the candidate architecture.

13. The method of claim 12, wherein prior to the joint updating, updating the shared set of parameters without updating the controller policy parameters comprises:

linearly decreasing p from 1 to 0 during the updating the shared set of parameters without updating the controller policy parameters.

14. The method of claim 12, wherein when all of the operations represented by all of the respective decision values are included in the candidate architecture, determining the update for the selected architecture comprises:

during a forward pass through the neural network for a batch of training examples: applying each of the operations to each input to a point in the neural network represented by the categorical decision, computing, for each input, an average of the outputs of the operations for the input as an output of the point in the neural network represented by the categorical decision, and storing only the inputs to the categorical decision and the outputs of the categorical decision for use in a backward pass through the neural network; and during the backward pass through the neural network for the batch of training examples, recomputing the outputs of the operations by again applying each of the operations to the stored inputs to the categorical decision.

15. The method of claim 1, wherein the space of candidate architectures is a space of architectures for a convolutional neural network, wherein a particular one of the categorical decisions represents a number of output filters of a convolutional neural network layer in the convolutional neural network, wherein the decision values for the particular categorical decision correspond to different numbers of output filters ranging from a first number to a second number, and wherein a candidate architecture defined by a set of decision values having a given decision value for the particular categorical decision that represents a given number of output filters for the convolutional neural network layer includes:

the convolutional neural network layer with the second number of output filters but with a third number of output filters zeroed out, wherein the third number of output filters is equal to a difference between the second number and the given number.

16. The method of claim 15, wherein selecting the candidate architecture comprises, for the particular categorical decision:

with probability q, configuring the convolutional neural network layer to have the second number of output filters with none of the output filters zeroed out, and with probability 1−p, sampling a decision value from a fixed initial probability distribution for the particular categorical decision and configuring the convolutional neural network layer to have the second number of output filters but with a fourth number of output filters zeroed out, wherein the fourth number is equal to a difference between the second number and the number corresponding to the sampled decision value.

17. The method of claim 16, wherein prior to the joint updating, updating the shared set of parameters without updating the controller policy parameters comprises:
linearly decreasing q from 1 to 0 during the updating the shared set of parameters without updating the controller policy parameters.

18. The method of claim 1, wherein the controller policy parameters include for each of the categorical decisions, a respective parameter for each decision value for the categorical decision.

19. The method of claim 18, wherein, for each of the categorical decisions, the probability distribution that is defined by the controller policy parameters is generated by applying a softmax to the respective parameters for the decision values for the categorical decision.

20. The method of claim 1, wherein the selecting comprises:
when updating the shared set of parameters: storing only a proper subset of intermediate outputs generated by any given neural network having any given candidate architecture during a forward pass through the given neural network, and recomputing intermediate outputs that are not in the proper subset during a backward pass through the neural network to compute a gradient of the objective function.

21. The method of claim 1, wherein the joint updating comprises:
increasing a learning rate of the reinforcement learning updates to the controller policy parameters during the joint updating.

22. A system comprising one or more computers and one or more storage devices storing instructions that when executed by the one or more computers cause the one or more computers to perform operations comprising:
receiving training data and validation data for a particular machine learning task;
receiving data specifying a target latency for performing the particular machine learning task; and
selecting, from a space of candidate architectures and using the training data and the validation data, an architecture for a neural network to be deployed for performing the machine learning task,
wherein each candidate architecture in the space has a different subset of a shared set of model parameters that is defined by a corresponding set of decision values that includes a respective decision value for each of a plurality of categorical decisions, and
wherein the selecting comprises:
jointly updating (i) a set of controller policy parameters that define, for each of the plurality of categorical decisions, a respective probability distribution over decision values for the categorical decision and (ii) the shared set of parameters, wherein:
updating the set of controller policy parameters comprises updating the set of controller policy parameters through reinforcement learning to maximize a reward function that measures an estimated quality and an estimated latency of candidate architectures defined by sets of decision values sampled from probability distributions generated using the controller policy parameters,
the reward function includes a quality term that measures the estimated quality of a candidate architecture and a latency term that is based on an absolute value of a term that compares the estimated latency of the candidate architecture and the target latency, and
updating the shared set of model parameters comprises updating the shared set of model parameters to optimize an objective function that measures a performance on the particular machine learning task of the candidate architectures defined by the sets of decision values sampled from the probability distributions generated using the controller policy parameters; and
after the joint updating, selecting as the architecture for the neural network, a candidate architecture that is defined by respective particular decision values for each of the plurality of categorical decisions.

23. One or more non-transitory computer-readable storage media storing instructions that when executed by one or more computers cause the one or more computers to perform operations comprising:
receiving training data and validation data for a particular machine learning task;
receiving data specifying a target latency for performing the particular machine learning task; and
selecting, from a space of candidate architectures and using the training data and the validation data, an architecture for a neural network to be deployed for performing the machine learning task,
wherein each candidate architecture in the space has a different subset of a shared set of model parameters that is defined by a corresponding set of decision values that includes a respective decision value for each of a plurality of categorical decisions, and
wherein the selecting comprises:
jointly updating (i) a set of controller policy parameters that define, for each of the plurality of categorical decisions, a respective probability distribution over decision values for the categorical decision and (ii) the shared set of parameters, wherein:
updating the set of controller policy parameters comprises updating the set of controller policy parameters through reinforcement learning to maximize a reward function that measures an estimated quality and an estimated latency of candidate architectures defined by sets of decision values sampled from probability distributions generated using the controller policy parameters,
the reward function includes a quality term that measures the estimated quality of a candidate architecture and a latency term that is based on an absolute value of a term that compares the estimated latency of the candidate architecture and the target latency, and
updating the shared set of model parameters comprises updating the shared set of model parameters to optimize an objective function that measures a performance on the particular machine learning task of the candidate architectures defined by the sets of decision values sampled from the probability distributions generated using the controller policy parameters; and
after the joint updating, selecting as the architecture for the neural network, a candidate architecture that is defined by respective particular decision values for each of the plurality of categorical decisions.

* * * * *